Jan. 2, 1951 L. R. WILLIAMSON 2,536,674
PRESS BRAKE CRANK BEARING STRUCTURE
Filed July 25, 1947 2 Sheets-Sheet 1

INVENTOR.
LARKIN R. WILLIAMSON
BY Fay, Golrick & Fay
ATTORNEYS

Jan. 2, 1951   L. R. WILLIAMSON   2,536,674
PRESS BRAKE CRANK BEARING STRUCTURE
Filed July 25, 1947   2 Sheets-Sheet 2
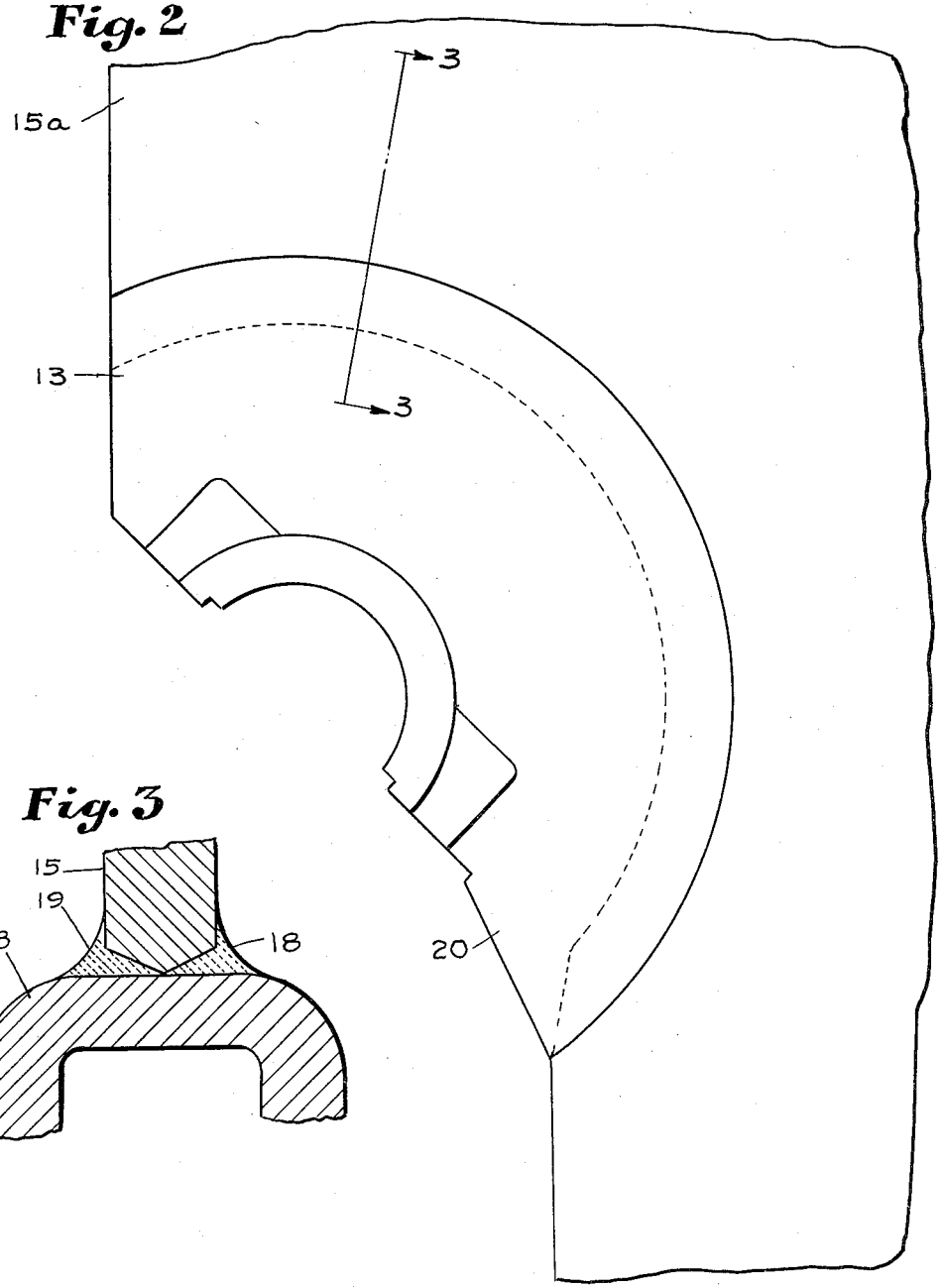
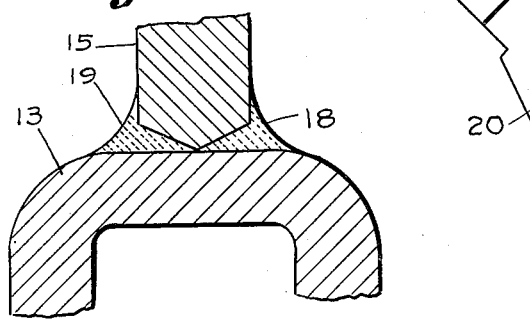
INVENTOR.
LARKIN R. WILLIAMSON
BY
*Fay, Golrick & Fay*
ATTORNEYS Patented Jan. 2, 1951

2,536,674

UNITED STATES PATENT OFFICE 2,536,674

PRESS BRAKE CRANK BEARING STRUCTURE

Larkin R. Williamson, Montclair, N. J.

Application July 25, 1947, Serial No. 763,685

1 Claim. (Cl. 308—23)

This invention relates to press brakes and particularly to the end frame and the crank shaft bearing support thereof. The general object of the present invention is the provision of a crank shaft bearing mounting and end plate frame member of such construction as to substantially increase the tensile strength of the end frame structure without materially increasing the bulk thereof.

More specifically, my invention is concerned with the provision of a unitary crank shaft support and end plate structure overhanging the vertical plane of the reactive forces set up by the crank shaft in a known manner but so constructed and arranged that the beam strength of the structure is increased substantially as compared to all previous similar constructions.

Other objects and advantages of the invention will be apparent from the following detailed description of preferred forms of embodiment of the invention, reference being made to the accompanying drawings wherein—

Fig. 2 is an enlarged diagrammatic plan view of the crank shaft region of the end plate structure; and Fig. 3 is a cross-sectional view showing the manner of integrating the crank shaft bearing support proper with the end plate.

Figure 1:
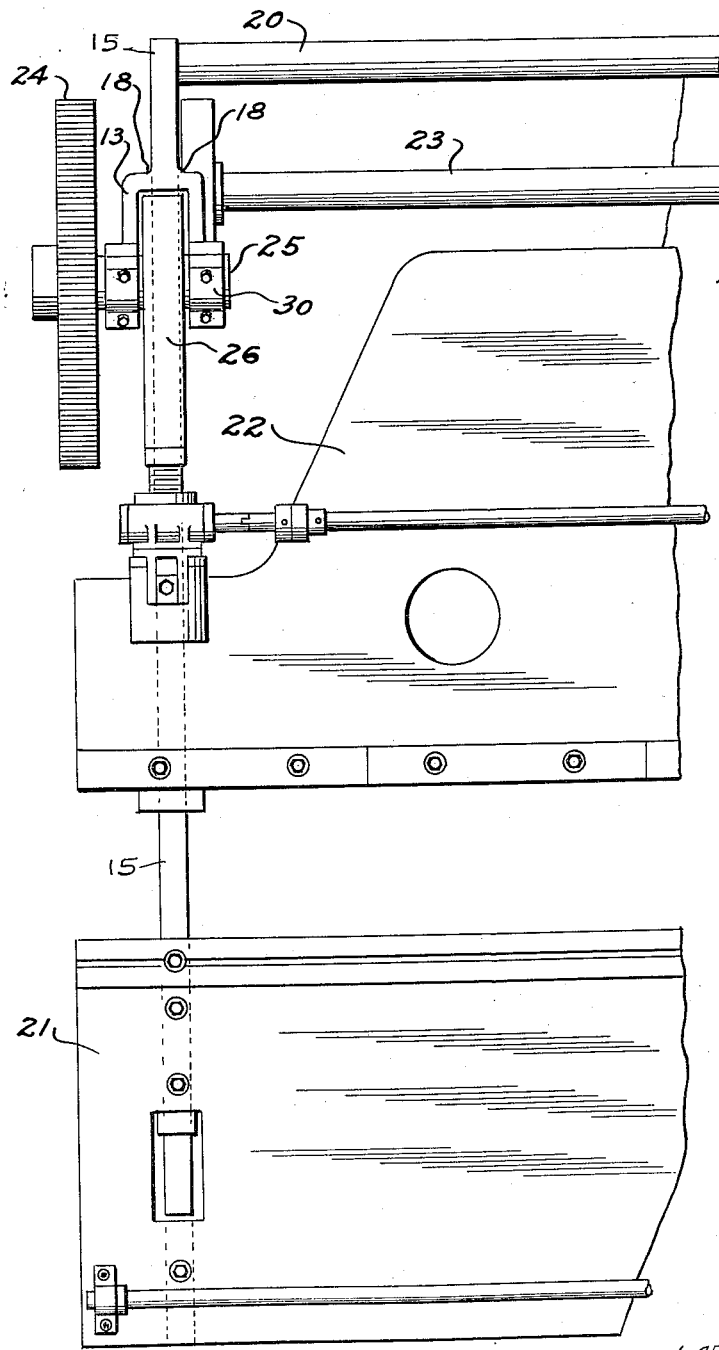
Fig. 1 shows a partial front elevation of a press brake incorporating the features of my invention.

In the design of modern press brakes it has been found that there is considerable advantage in the utilization of heavy steel slabs or rolled plates, such as from two to four inches in thickness for the construction of the bed and end frames and slide of the press brake. However, certain new problems are introduced, one of which is to obtain an adequate bearing support for the crank shafts of such press without resorting to cumbersome heavy metal designs.

In one prior practice the end frame member was formed of a steel slab of about 2½ inches in thickness and contoured at the upper forward part thereof to form an arcuate recession in the plate member which overhung relative to the axis of the crank shaft. This was done in order to have the forward vertical end of the plate disposed as close to the slide or ram as practicably possible. A crank shaft bearing support in the form of a steel casting having an annular groove formed therein to fit or span the thickness of the plate was fitted into the recession. The bearing support was of the split bearing type for the use of bearing cap members whereby the crank portions of the crank shaft could be disposed between two spaced-apart bearing formations of the support with the crank in substantial alignment with the central plane of the end plate. The plane of separation of the bearing caps and support was located horizontally, with the result that the bearing support member was cut away in the direction of the front edge of the plate in order to provide rests or clamping surfaces for the bearing cap members. This formed a beam design which weakened the otherwise available strength of the bearing support member to withstand the heavy reactive forces set up by the crank shaft when the crank approached its maximum downward position, that is, when the slide was approaching bottom.

I have found that by displacing the plane of joinder of the bearing cap members with the bearing support about 45° from the horizontal I am able to obtain a very substantial amount of additional metal in the bearing support structure in a region which greatly decreases the bending moment set up at any particular critical point due to the heavy forces mentioned.

In Fig. 1 of the drawings one half of a press brake of the type referred to is shown in front elevation and with a frame comprising end plates 15 connected by a pair of top tie rods 20 and a heavy bed plate 21. Slide or ram 22 is provided with slide and way connections at the back face thereof whereby the ram is reciprocably supported on the front edges of the end plates 15. A back shaft 23 carries pinions (not shown) which drive bull gears 24 mounted on crank shafts 25. The shafts 25 carry cranks or cams which operate pitmans 26. The bearing support structure 13 is such as to support the cranks with the axis thereof substantially in a vertical plane coincident with the central plane of the ram 22 and bed 21. Bearing caps 30 are bolted to the parallel walls comprising the crank shaft bearing support in a tilted position for the purpose above referred to and which will be explained in detail.

Referring to the drawings, in Fig. 2 I have shown the contour of the bearing support. In prior practice, it was seen that the bearing support member, usually a steel casing, was provided with spaced-apart annular flanges which spanned the end plates of the press frame and was held in position by a series of bolts. In my present arrangement the bearing support member 13 is secured along an annular recession formed in the end plate 15 in an integral manner, as, for example, by a double weld indicated by the reference numerals 18 and 19 with the torsion plane of the bearings disposed obliquely to the horizontal. In the present arrangement it will be noted that a very substantial triangular section of metal 20 remains in the housing support structure and the critical point of the bending moment is eliminated.

In the present arrangement the accessibility feature, coupled with ready assembly of the crank shafts is retained, but the overhanging part 15a of the end plate of the machine frame becomes an integral part with the bearing support structure 13 without decreasing the diameter of the crank shaft and bearings and bearing caps therefor and without increasing the bulk of the bearing support structure. The thickness of the end plate may vary within a liberal range of rolling mill tolerance without necessitating individual machining and fitting of flanges otherwise required on each bearing support.

I claim:

A combined bearing support and end frame member for a press brake of the type comprising spaced vertically extending metal plates with the forward edges thereof forming slideways for a vertically reciprocating ram, said bearing support comprising a forwardly projecting portion at the upper end of the plate overhanging the plane of reciprocating of said ram, the lower edge of said overhanging portion being inclined upwardly and forwardly from the forward edge of the plate and having a bearing recess therein intermediate the ends of said lower edge and lying in the plane of reciprocation of the ram and a bearing cap secured to said lower edge for retaining an operating crank for the ram therein, whereby the frame adjacent the bearing recess is reinforced against vertical thrust on the crank during operation of the ram.

LARKIN R. WILLIAMSON.

REFERENCES CITED

The following references are of record in the file of this patent:

UNITED STATES PATENTS

| Number | Name | Date |
|---|---|---|
| 809,392 | O'Reilly | Jan. 9, 1906 |
| 1,453,518 | Price | May 1, 1923 |
| 2,199,864 | Wehr | May 7, 1940 |
| 2,237,170 | Williamson | Apr. 1, 1941 |